ADHESIVE APPLIER USING REGISTER AND SWITCHING DEVICES

Filed Sept. 21, 1964 6 Sheets-Sheet 1

Inventors
BETTINA D. COOMBES
BERNARD P. H. BUNT
By [signature]
Attorneys

Inventors
BETTINA D. COOMBES
BERNARD F. H. BUNT By Imirie & Smiley
Attorneys

Inventors
BETTINA D. COOMBES
BERNARD P. H. BUNT By [signature]
Attorneys

Inventors
BETTINA D. COOMBES
BERNARD P. H. BUNT
By Imrie & Smiley
Attorneys

ADHESIVE APPLIER USING REGISTER AND SWITCHING DEVICES

INVENTORS
BETTINA D. COOMBES
BERNARD P. H. BUNT
Imirie & Smiley
Attys.

Inventors
BETTINA D. COOMBES
BERNARD P. H. BUNT
By Imrie & Smiley
Attorneys

United States Patent Office 3,411,008
Patented Nov. 12, 1968

3,411,008

ADHESIVE APPLIER USING REGISTER AND SWITCHING DEVICES

Bettina Doris Coombes, London, and Bernard Peter Heneage Bunt, Whyteleafe, England, assignors to The Metal Box Company Limited, London, England, a British company Filed Sept. 21, 1964, Ser. No. 397,927
Claims priority, application Great Britain, Sept. 23, 1963, 37,769/63
12 Claims. (Cl. 250—219)

ABSTRACT OF THE DISCLOSURE

Discontinuity in lines of adhesive applied to carton blanks is discerned by a detector electrically connected to a fault-indicating device which is electrically connected to the first register unit of a plurality of register units which are connected in series and with a driver circuit which produces successive pulses to transfer a signal from said device in succession from one register unit to the next, and a switching means determines from which of the register units a signal is emitted to cause the faulty blank to be displaced relative to other blanks moved in succession past the detector.

Figure 1:
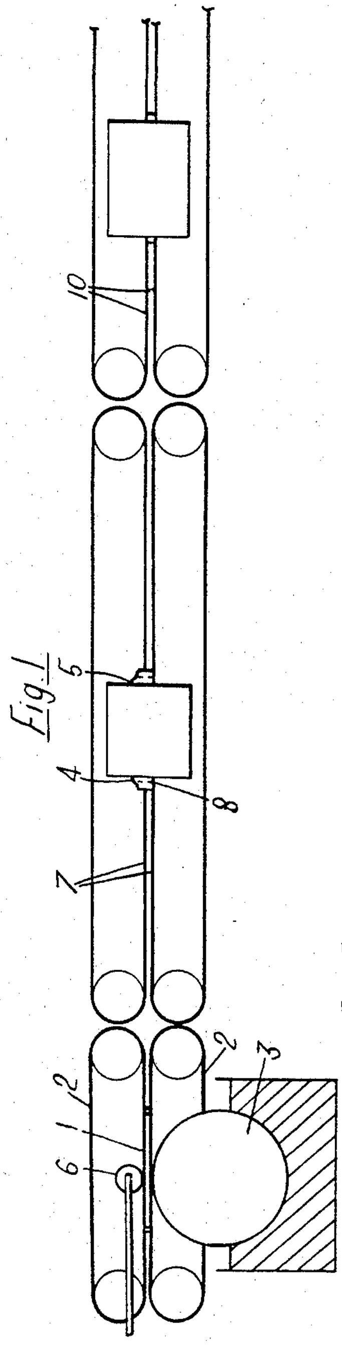

This invention relates to apparatus for applying material, for example, adhesive, to an area of an article, for example a carton blank, and where herein the term "material" is employed it is deemed to include any material, for example glue, paste, or thermoplastic material, such as may be applied to an article, for example for the purpose of adhering one portion of a carton blank to another portion thereof.

During the production of cartons from blanks it is usual to fold the blanks to form flattened tubes which are later to be set-up to form cartons, for example cartons of four-sided rectangular cross-section, and the cartons in the flattened form are provided with a longitudinal seam which is formed by adhering one side panel of the carton to a flap hingedly connected to another of the side panels. It is found during the high speed production of such cartons that a small percentage of the cartons have defects in the line of adhesive by which the seam is formed and these defects, which range in size from a small gap extending only partly across the width of the line of adhesive to a flap which is provided with no adhesive, arise from a variety of causes inherent in the carton making process. Should the cartons be intended to receive a powder even small gaps in the continuity of the line of adhesive may result in leakage of the powder from the carton.

It is a main object of the invention to provide apparatus for applying material to articles, for example carton blanks, which appartus includes means for detecting gaps in the continuity of the material and for giving an indication thereof so that the faulty articles can be removed from the production line.

According to the invention there is provided apparatus for applying material to an area of an article, for example of a carton blank, comprising conveyor means operable to move articles in succession, a material applicator operable to apply material to a predetermined area of an article, a detector device operable to detect discontinuity in the material applied to the article and to emit a signal indicative of the detection of the fault, a fault-registering device responsive to signals emitted by the detector device and operable to transmit an actuating signal, and a fault-indicating device operable by an actuating signal transmitted by the fault-registering device.

The fault-indicating device may include an audible indicator. The device may also include a visible indicator. Further, the device may include a pusher element operable to displace an article relative to the line of movement thereof by the conveyor means.

The fault-registering device may be an electrical device arranged to transmit an electrical actuating signal and the fault-indicating device include an electronic shift register consisting of register units connected in series and having the first unit electrically connected with the fault-registering device to receive fault-indicating signals therefrom, a driver circuit electrically connected with the shift register and producing successive pulses to transfer an actuating signal in succession from one register unit to the next, and switching means electrically connected with the shift register to switch an actuating signal from the register to an actuating device arranged to effect operation of the pusher element.

The switching means may include a selectively operable switch pre-settable to connect the actuating device with a predetermined unit of the shift register.

The driver circuit may be operated in synchronism with the conveyor means by a control device comprising a disc rotatable with a driving member for the conveyor means and provided with equi-spaced light-reflecting elements, light-transmitting means operable to focus a beam of light on each light-reflecting element in turn, and a photo-electric cell positioned to view an illuminated light-reflecting element and electrically connected with the driver circuit.

The detector device may comprise a photo-multiplier electrically connected with the fault-registering device and arranged to receive light through an apertured screen and a filter, a scanning lens focussed on the path of the material-coated area of an article and arranged to produce on the aperture of said screen an enlarged image of the coated area as it passes the lens, light-transmitting means, and a lens interposed between the light-transmitting means and the path of the article to collimate light on the area on which the scanning lens is focussed. There may also be included a photo-electric cell and a source of light disposed on opposite sides of the path of the articles, said photo-electric cell being electrically connected with the fault-registering device and operable as the trailing edge of an article passes the cell to cause the fault-registering device to transmit an actuating signal when the detector device has detected a fault in the material of the material-coated area of the article and has emitted a signal to the fault-registering device.

Figure 2:
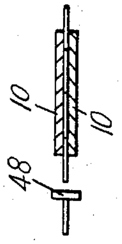
Figure 3:
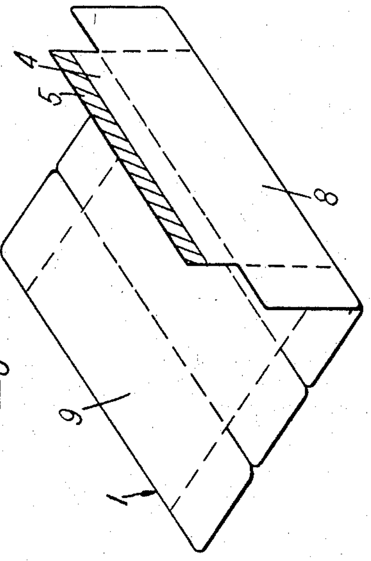
Figure 4:
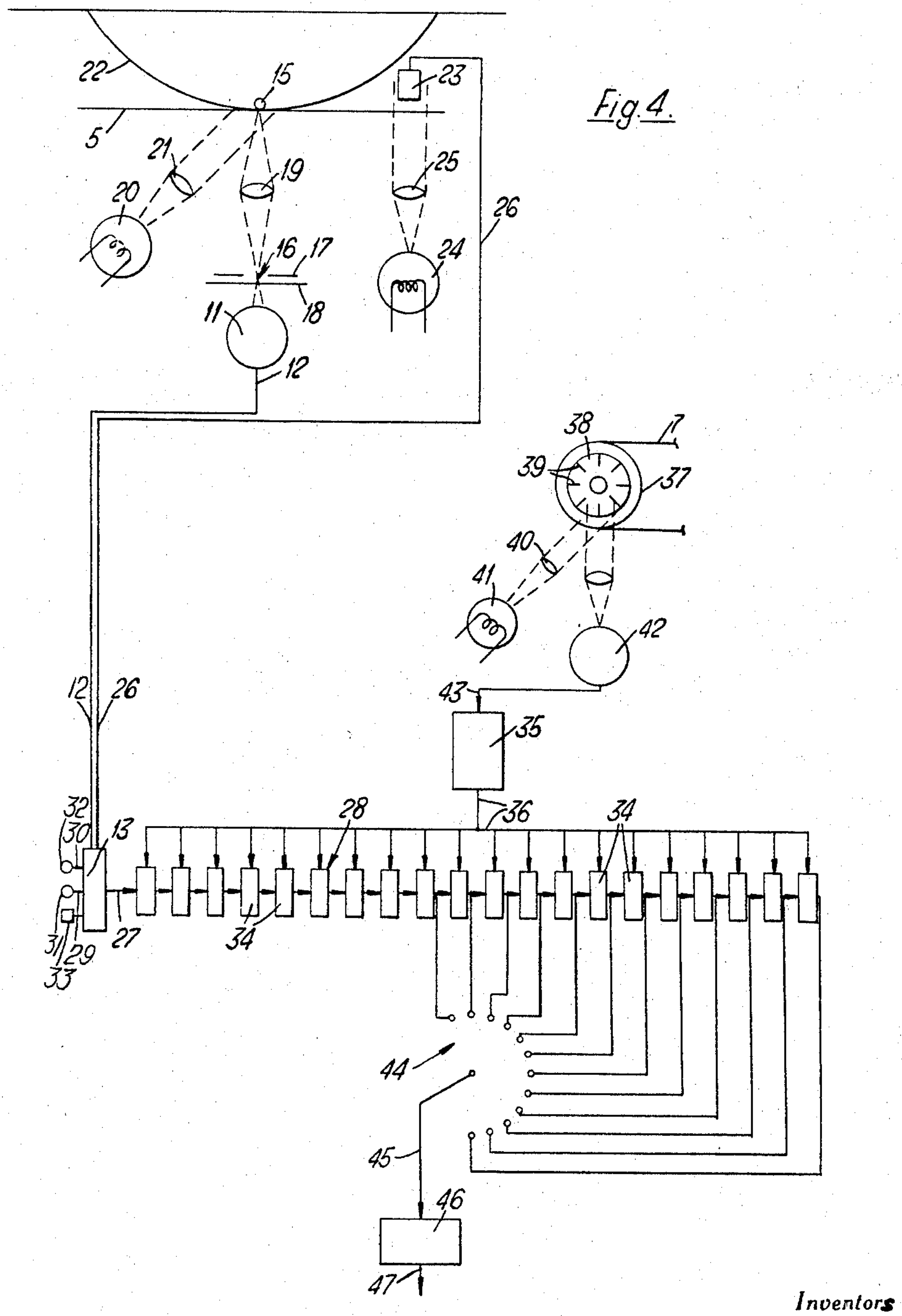
Figure 5:
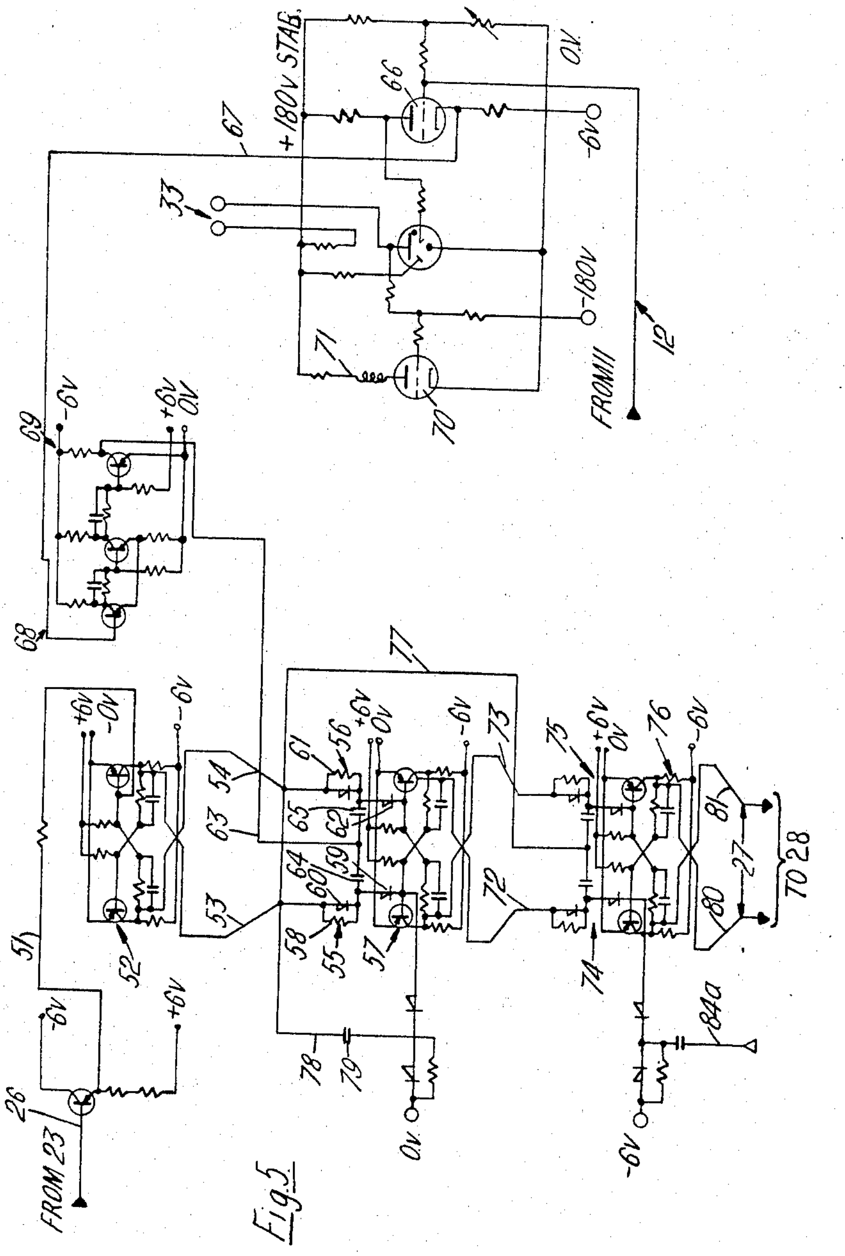
Figure 6:
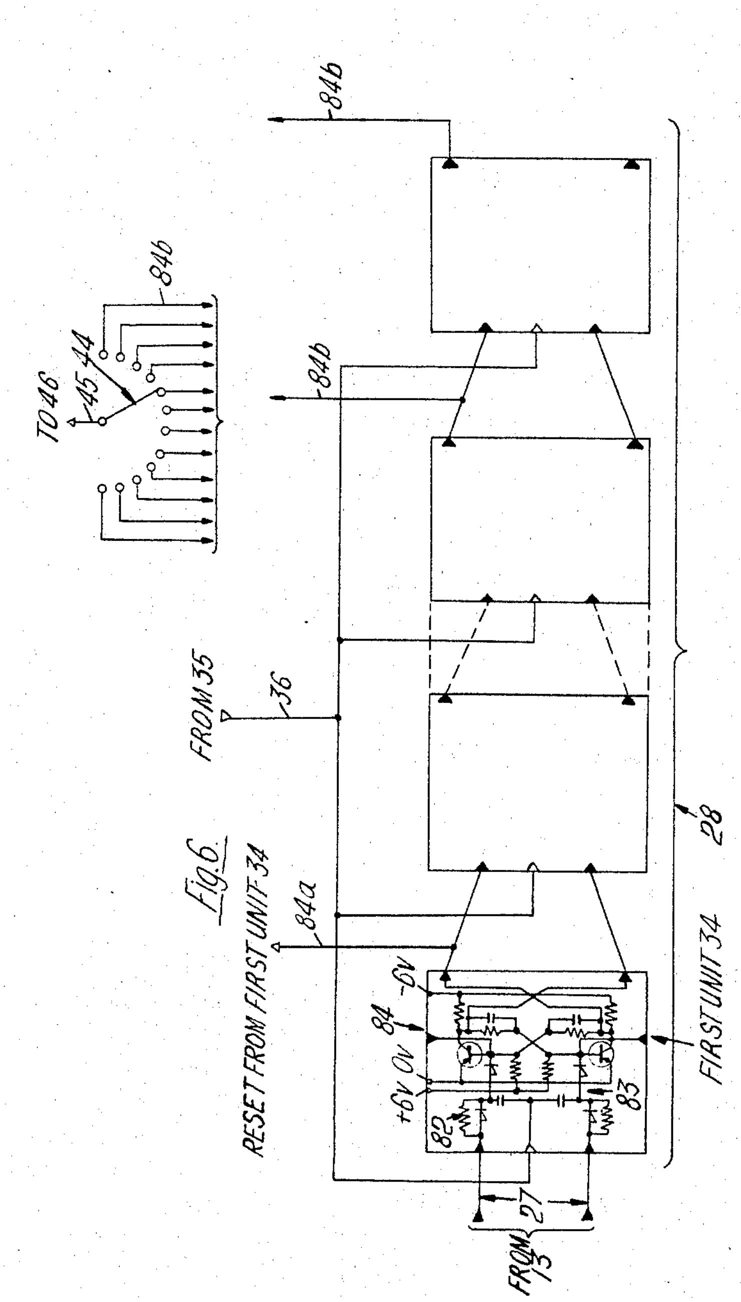
Figure 7:
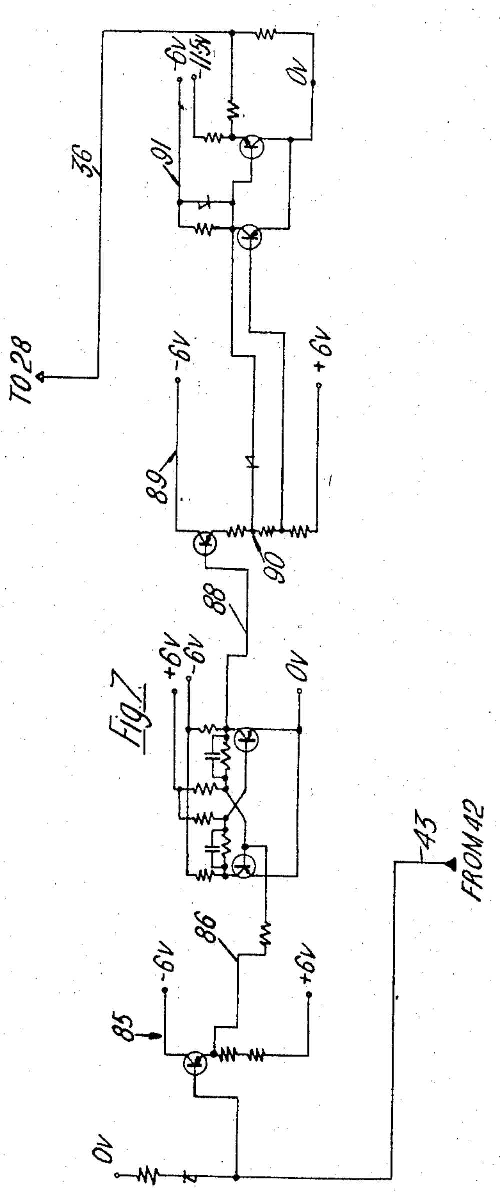
Figure 8:
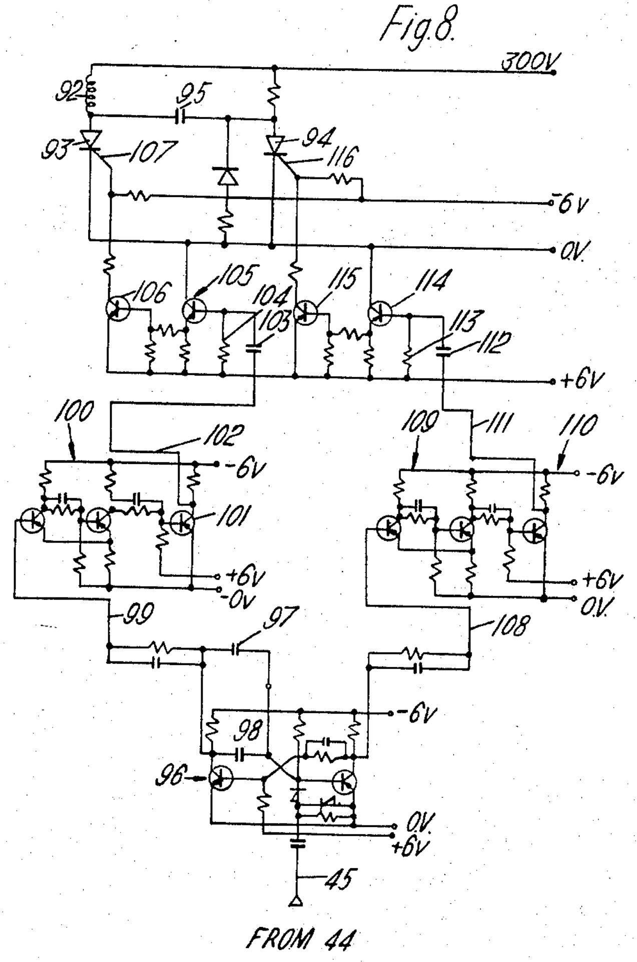

In order that the invention may be clearly understood one embodiment thereof will now be described, by way of example, with reference to the accompanying diagrammatic drawings, in which:

FIG. 1 illustrates diagrammatically a carton-glueing machine having apparatus according to the invention applied thereto, FIG. 2 is a top plan of a part of FIG. 1, FIG. 3 illustrates a glued carton blank to be inspected by the apparatus according to the invention, FIG. 4 illustrates diagrammatically the apparatus according to the invention for inspecting the glue line applied to a carton blank during formation of a carton from the blank, FIG. 5 is the circuit diagram of a part of a fault-registering device shown in block form in FIG. 4, FIG. 6 is a circuit diagram of a shift register forming a part of the fault-registering device, FIG. 7 is the circuit diagram of a driver circuit for driving the shift register of FIG. 6, and FIG. 8 is the circuit diagram of an actuating device for a pusher element embodied in the apparatus shown in FIG. 1.

Referring to the drawings, carton blanks 1, FIG. 3, are moved, face downwards, in succession by conveyor means comprising endless belts 2, FIG. 1, or rollers, between which the blanks are firmly held as they are moved towards and past an adhesive applicator consisting of a rotatable adhesive-applying wheel 3 against which the flap 4 of the blank, which is to receive a line 5 of adhesive, is held by a small spring-loaded wheel 6. After passing the adhesive applicator the blank is moved by further endless belts 7 past tube-forming folder elements, not shown, which fold the flap 4 and the carton panel 8 to which it is hingedly connected through 180° and which simultaneously fold the panel 9, which is to be adhered to the flap 4, until it overlies the adhesive coated area of the flap 4 and is pressed into engagement therewith so as to form a flattened tube which later can be set up to form a carton of four-sided rectangular cross-section. The flattened tubular cartons are passed through a short section of the machine while being held comparatively lightly between travelling belts 10 and thereafter to a final compression belt and to a stacker, not shown.

The flaps 4 to which the adhesive is applied are all substantially white and for the purposes of inspection the adhesive includes colouring matter which, if the cartons are to contain food, is an edible dye. The adhesive coated areas 5 are, as described below, to be scanned by a photoelectric detector and as detectors of this kind are usually sensitive to the colour blue the dye employed is preferably a dense red dye. It is however, to be understood that, if desired, dyes of a colour other than red may be used.

Following the application of the adhesive to a blank, and before subjection to the final folding action of the tube-forming folders, the blank is moved by the conveyor means 7 past a detector device operable to detect discontinuity in the adhesive applied to the coated area 5 of the blank and to emit a signal indicative of the detection of a fault. A fault-indicating signal is transmitted to a fault-registering device which in turn is operable to transmit an actuating signal to a fault-indicating device.

Referring to FIG. 4, the detector device comprises a photo-multiplier 11 which is electrically connected by line 12 with a fault-registering device 13 which is described below with reference to FIG. 5. As illustrated in FIG. 4 the portion 5 of a blank to which the adhesive has been applied, having been folded into a vertical position for scanning by the photo-multiplier 1, is supported in this position by a guide 15. The photo-multiplier 11 receives light through an aperture 16 formed in a screen 17 and a blue filter 18. Between the screen 17 and the blank portion 5 is a scanning lens 19 which is focussed on the path of the coated area of the blank portion 5 and which is arranged to produce on the aperture 16 an enlarged image of the coated area as it passes the lens. Light-transmitting means, shown as a lamp 20, is provided and a lens 21 is interposed between the lamp 20 and the path of the blank portion 5 to collimate light on to the area on which the scanning lens 19 is focussed. A shield 22 and a hood, not shown, round the lens 19 minimise the amount of stray light which may reach the photo-multiplier 11. When no blank is passing the scanning position the amount of light reaching the photo-multiplier 11 is small and the effect is the same as if a properly coated area is being scanned.

The fault-registering device 13 is controlled by the sensing of the leading and trailing edges of a blank and for this purpose a photo-electric cell 23 and a source of light 24 are disposed on opposite sides of the path of the blank portions 5 at a position which is only slightly in advance of the scanning position and which is less than that between successive blanks. A lens 25 collimates light from source 24 onto cell 23. Thus while the blank portion 5 is interposed between the light 24 and the photoelectric cell 23 the fault-registering device 13 is conditioned along line 26 to receive fault-indicating signals from the photo-multiplier 11 and when the trailing edge of the blank portion 5 passes cell 23 the device 13 transmits an actuating signal along line 27 to a fault-indicating device 28 if a fault has been sensed.

When the device 13 receives a fault-indicating signal, a relay, 71 indicated in FIG. 5, causes, via lines 29 and 30, operation of additional fault-indicating devices in the form of an audible indicator 31 and of a visual indicator 32. The circuit for indicators 31 and 32 may be re-set by a switch 33 operated by the machine minder.

The fault-indicating device 28 comprises an electronic shift register consisting of register units 34, which are shown in FIG. 6 as transistor "flip-flop" circuits, connected in series and having the first unit, that is the unit at the left of FIG. 4, electricallly connected via line 27 with the fault-registering device. 13. A driver circuit 35, shown in greater detail in FIG. 7, is also connected by line 36 with the device 28 and is arranged to produce a succession of shift pulses to transfer an actuating signal in succession from one unit 34 to the next. The shift pulses are applied in parallel to each unit of the device 28. The driver circuit is operated in synchronism with the conveyor means 7 which are driven by a rotatable driving member 37. A matt black disc 38 is rotatable with the driving member 37 and is provided with a plurality of equi-spaced radial light-reflecting elements 39 such as chromium plated inserts. A lens 40 focuses a beam of light from a lamp 41 on each element 39 in turn and a photo-electric cell 42 is positioned to view an illuminated element 39 and via line 43 to transmit pulses to the driver circuit 35. Because the pulses from the photoelectric cell 42 are obtained from the disc 38 which rotates at the same speed as the driving member 37 the pulses are directly coupled to the linear speed of the conveyor means 7 and when a signal from the fault-registering device 13 has been entered on the shift register 28 and reaches the last unit of the shift register the blank has travelled a definite predetermined distance along the machine and is positioned before a pusher element described below. If desired, instead of the pulses to the driver circuit being photo-electrically derived they may be derived by an electro-magnet system.

Switching means 44 connects the fault-indicating device 28 via line 45 with an actuating device 46, described below with reference to FIG. 8, operates, via line 47, a solenoid 92, FIG. 8, which in turn operates a pusher element 48, FIG. 2, arranged to displace a carton, which by the photo-multiplier 11 has been found to be faulty, relative to the line of movement of the carton by the conveyor means 10 so that the faulty carton can be easily recognised and removed by the machine minder. The switch 44 is a selectivity operable switch which is presettable to connect the actuating device 46 with a predetermined unit 34 of the shift register. The switch 44 is preferably so pre-set that the pusher 48 engages the trailing end of a carton because this ensures the greatest movement of the carton out of line and renders more easy the detection of the displaced carton by the machine minder.

A pulse on line 45 causes the actuating device 46 to switch power to the solenoid. Because carton speeds may be high very little time is available for the ejection operation to ensure that successive faulty cartons are struck individually by the pusher. Accordingly, a second pulse, delayed for about 20 milli-seconds, causes the solenoid to be de-energised in order to ensure that the solenoid is ready to operate again on a succeeding carton, if necessary.

The operation of the electrical circuits will now be described in greater detail with reference to FIGS. 5 to 8. When the front edge of a blank is sensed the voltage on line 26 from the photo-electric cell 23, FIG. 4, falls. The line 26, see FIG. 5, is connected to the base of an emitter follower 50, and the output from the emitter follower 50 is connected by a line 51 to one input of a "flip-flop" circuit 52 of conventional design.

Outputs on lines 53 and 54 from the "flip-flop" circuit 52 are connected to inputs of two gates 55 and 56 which are the input circuits to a further "flip-flop" circuit 57 of the same design as the circuit 52. The gate 55 consists of a resistor 58 connected to the line 53, and a diode 59 connected to the base of one transistor of the "flip-flop" circuit 57. A diode 60 shunted across the resistor 58 gives speedy operation of the gate. Similarly the gate 56 consists basically of a resistor 61 connected to line 54 and a diode 62 connected to the base of the second transistor of the "flip-flop" circuit 57.

When the edge of a blank is detected the "flip-flop" circuit 52 conditions the gate 56 so that a fault-indicating pulse fed to both the gates on line 63 via capacitors 64 and 65 is transmitted by gate 56 to one trigger input of the "flip-flop" circuit 57.

The detection of a fault by the photomultiplier 11 results in the transmission of a pulse on line 12 to the grid of a cathode follower 66. The cathode of the cathode follower is connected by a line 67 to a pulse shaping circuit consisting of a Schmitt trigger circuit 68 and an amplifier 69 whose collector is connected to line 63.

The anode of the cathode follower 66 is connected to the trigger electrode of a trigger tube 69 which strikes when a fault is detected thereby operating a power amplifier triode 70 in whose anode circuit there is connected the coil 71 of an alarm relay.

At the same time as the alarm relay is operated, the shaped fault-indicating pulse transmitted on line 63 passes through the gate 56 and is set into the "flip-flop" circuit 57 so that the output D.C. levels on lines 72 and 73 from the "flip-flop" circuit 57 indicate the presence of a fault in the adhesive-coated area of the blank which is being sensed. The lines 72 and 73 are connected to inputs of two gates 74 and 75 which are identical to the gates 55 and 56 and are connected to the trigger inputs of a further "flip-flop" circuit 76. The common inputs of the gates 74 and 75 receive an input on a line 77 which is connected to the line 54, and when the trailing edge of the blank is sensed by the photo-electric cell 23 a pulse on line 77 gates into the "flip-flop" circuit 76 the information stored in "flip-flop" circuit 57. That is, if a fault has been sensed in the adhesive coated area of a blank, the sensing of the trailing end of the faulty blank by the edge detector 23 causes the indication of that fault to be transferred into the "flip-flop" circuit 76. The sensing of the trailing edge of the blank also resets the "flip-flop" circuit 57 by a pulse on line 78 which is also connected to the line 54. The capacitor 79 in the line 78 delays the resetting of the "flip-flop" circuit 57 until the setting period for the "flip-flop" circuit 76 has passed.

The output from the "flip-flop" circuit 76 to the shift register is indicated diagrammatically by a line 27 in FIG. 4, but in fact constitutes two lines 80 and 81, FIG. 5, which are connected to the input gates 82 and 83, FIG. 6, of a "flip-flop" circuit 84 which is the first unit of the shift register. The construction and operation of the "flip-flop" circuit 84 and its gates 82, 83 and of all the rest of the identical units of the shift register is the same as that of the "flip-flop" circuit 57 and its gates 55 and 57 just described with reference to FIG. 5. A line 84*a* from the "flip-flop" circuit 84 output is connected to the reset circuit of the "flip-flop" circuit 76 so that the "flip-flop" circuit 76 is reset after the "flip-flop" circuit 84 has been set. Lines 84*b* connect the units 34 with the switch 44.

Shift pulses are transmitted in parallel to the units of the shift register 34 on the line 36 which is connected to the driver circuit 35 illustrated in FIG. 7. Line 43 carrying synchronising pulses is connected to an emitter follower 85 whose emitter is connected by a line 86 to one trigger input of a "flip-flop" circuit 87 which defines the correct voltage levels for the synchronising pulses. An output on line 88 from the "flip-flop" circuit 87 is connected through another emitter follower 89 including an anti-saturation circuit 90 to a two-stage inverting amplifier circuit 91 whose output is on line 36. This amplifier circuit 91 has a low output impedance for matching into the shift inputs of all the units of the shift register, and gives the shift pulses a sharp rising edge.

The selected one of the shift register outputs is connected by line 45 to the pusher actuating device 46 which is shown in FIG. 8.

The solenoid of the pusher element 48 is indicated at 92 and is controlled by two silicon controlled rectifiers 93 and 94 which are connected in parallel through a capacitor 95. Normally the rectifier 94 is conducting and the rectifier 93 is cut off.

A fault is indicated by a positive-going pulse on line 45, which pulse is lengthened by a pulse lengthening circuit 96 to which the line 45 is connected, the lengthening of the pulse being controlled by the total capacitance of the two capacitors 97 and 98. If there is a fault, the lengthened pulse is transmitted on line 99 to a Schmitt trigger circuit 100 which acts as a pulse shaper and gives a fast rising edge, and the shaped pulse is then amplified by the amplifier 101 whose output on line 102 is differentiated by the capacitor 103 and resistor 104 which are connected to the input of an emitter follower 105 whose output is connected to a further amplifier 106 which is in series with the trigger electrode 107 of the silicon controlled rectifier 93.

At the end of the fault pulse the negative going edge on line 108 is shaped by a Schmitt trigger circuit 109 and amplified by an amplifier 110 before being transmitted via a line 111, a differentiating circuit 112 and 113, an emitter follower 114 and an amplifier 115 to the trigger electrode 116 of the rectifier 94. When the rectifier 93 becomes conducting, the rectifier 94 cuts off because of the commutating operation of the circuit of the two rectifiers 93 and 94. The rectifier 94 is restored to conduction by the pulse supplied to its trigger electrode 116. The potential of its anode falls and this fall is transmitted through the capacitor 95 and effectively cuts off the H. T. supply to the rectifier 93 so that this rectifier becomes non-conductive, the solenoid 92 is de-energised, and the pusher element 48 is withdrawn. The rectifier 94 then remains in its normal conductive state until the trigger electrode 107 receives a further fault-indicating pulse.

In the foregoing description the apparatus has been described as applied to a machine for making flattened tubular cartons. It will, however, be understood that the apparatus can be used in conjunction with a machine which only applies adhesive to carton blanks and from which the blanks issue in flat form for folding at a later time.

We claim:

1. Apparatus for applying material to an area of an article, for example of a carton blank, comprising conveyor means operable to move articles in succession, a material applicator operable to apply material to a predetermined area of an article moved by the conveyor means, a detector device operable to detect discontinuity in the material applied to the article and to emit an electrical signal indicative of the detection of the fault, an electrical fault-registering device responsive to signals emitted by the detector device and operable to transmit an electrical actuating signal, and a fault-indicating device operable by an actuating signal and including a pusher element and an actuating device connected with the pusher element and operable to cause the pusher element to displace an article relative to the line of movement thereof by the conveyor means, said fault-registering device including an electronic shift register consisting of register units connected in series and having the first unit electrically connected with the fault-registering device to receive fault-indicating signals therefrom, a driver circuit electrically connected with the shift register and operable to produce successive pulses to transfer an actuating signal in succession from one register unit to the next, and switching means electrically connected with the shift register to switch an actuating signal from the shift register to said actuating device.

2. Apparatus according to claim 1, wherein the switching means includes a selectively operable switch pre-settable to connect the actuating device with a pre-determined unit of the shift register.

3. Apparatus according to claim 1, wherein the driver circuit is operated in synchronism with the conveyor means by a control device comprising a disc which is provided with equi-spaced light-reflecting elements and which is rotatable with a driving member for the conveyor means, light-transmitting means operable to focus a beam of light on each light-reflecting element in turn, and a photo-electric cell positioned to view an illuminated light-reflecting element and electrically connected with said driver.

4. Apparatus according to claim 1, wherein the detector device comprises a photo-multiplier electrically connected with the fault-registering device, an apertured screen and a filter interposed between the photo-multiplier and the path of the material coated areas of the articles, a scanning lens focussed on said path and arranged to produce on the aperture of said screen an enlarged image of the coated areas as they pass the lens, light-transmitting means operable to direct a beam of light on to said path, and a lens interposed between the light-transmitting means and said path to collimate light on the area on which the scanning lens is focussed.

5. Apparatus according to claim 4, including a photo-electric cell and a source of light disposed on opposite sides of said path, said photo-electric cell being electrically connected with the fault-registering device and operable as the trailing edge of an article passes the cell to cause the fault-registering device to transmit an actuating signal when the detector device has detected a fault in the material of the material-coated area of the article and has emitted a signal to the fault-registering device.

6. Apparatus for applying adhesive to a carton blank, comprising an adhesive applicator operable to apply adhesive to a predetermined area of a blank, conveyor means operable to move blanks in succession to and past the adhesive applicator, a detector device operable to detect discontinuity in the adhesive applied to a blank and to emit an electrical signal indicative of the detection of the fault, an electrical fault-registering device responsive to signals emitted by the detector device and operable to transmit an electrical actuating signal, and a fault-indicating device operable by an actuating signal and including a pusher element and an actuating device connected with the pusher element to cause the pusher element to displace a blank relative to the line of movement thereof by the conveyor means, said fault-registering device including an electronic shift register consisting of register units connected in series and having the first unit electrically connected with the fault-registering device to receive fault-indicating signals therefrom, a driver circuit electrically connected with the shift register and operable to produce successive pulses to transfer an actuating signal in succession from one register unit to the next, and switching means electrically connected with the shift register to switch an actuating signal from the shift register to said actuating device.

7. Apparatus according to claim 6, wherein the switching means includes a selectively operable switch presettable to connect the actuating device with a predetermined unit of the shift register.

8. Apparatus according to claim 6, wherein the driver circuit is operated in synchronism with the conveyor means by a control device comprising a disc which is provided with equi-spaced light-reflecting elements and which is rotatable with a driving member for the conveyor means, light-transmitting means operable to focus a beam of light on each light-reflecting element in turn, and a photoelectric cell positioned to view an illuminated light-reflecting element and electrically connected with said driver.

9. Apparatus according to claim 6, wherein the detector device comprises a photo-multiplier electrically connected with the fault-registering device, an apertured screen and a filter interposed between the photo-multiplier and the path of the material coated areas of the articles, a scanning lens focussed on said path and arranged to produce on the aperture of said screen an enlarged image of the coated areas as they pass the lens, light-transmitting means operable to direct a beam of light on to said path, and a lens interposed between the light-transmitting means and said path to collimate light on the area on which the scanning lens is focussed.

10. Apparatus according to claim 9, wherein a photo-electric cell and a source of light disposed on opposite sides of said path, said photo-electric cell being electricaly connected with the faut-registering device and operable as the trailing edge of an article passes the cell to cause the fault-registering device to transmit an actuating signal when the detector device has detected a fault in the material of the material-coated area of the article and has emitted a signal to the fault-registering device.

11. Apparatus according to claim 8, wherein the detector device comprises a photo-multiplier electrically connected with the fault-registering device, an apertured screen and a filter interposed between the photo-multiplier and the path of the material coated areas of the articles, a scanning lens focussed on said path and arranged to produce on the aperture of said screen an enlarged image of the coated areas as they pass the lens, light-transmitting means operable to direct a beam of light on to said path, and a lens interposed between the light-transmitting means and said path to collimate light on the area on which the scanning lens is focussed.

12. Apparatus according to claim 11, wherein a photo-electric cell and a source of light disposed on opposite sides of said path, said photo-electric cell being electrically connected with the fault-registering device and operable as the trailing edge of an article passes the cell to cause the fault-registering device to transmit an actuating signal when the detector device has detected a fault in the material of the material-coated area of the article and has emitted a signal to the fault-registering device.

References Cited

UNITED STATES PATENTS

| | | | |
|---|---|---|---|
| 2,395,482 | 2/1946 | Hurley | 250—219 |
| 3,026,415 | 3/1962 | Lake et al. | 250—219 |

RALPH G. NILSON, *Primary Examiner.*

M. ABRAMSON, *Assistant Examiner.*